Oct. 13, 1936. O. T. S. MADSEN 2,057,439
TOOTH SETTING DEVICE FOR BAND SAW BLADES
Filed Dec. 7, 1935 2 Sheets—Sheet 1
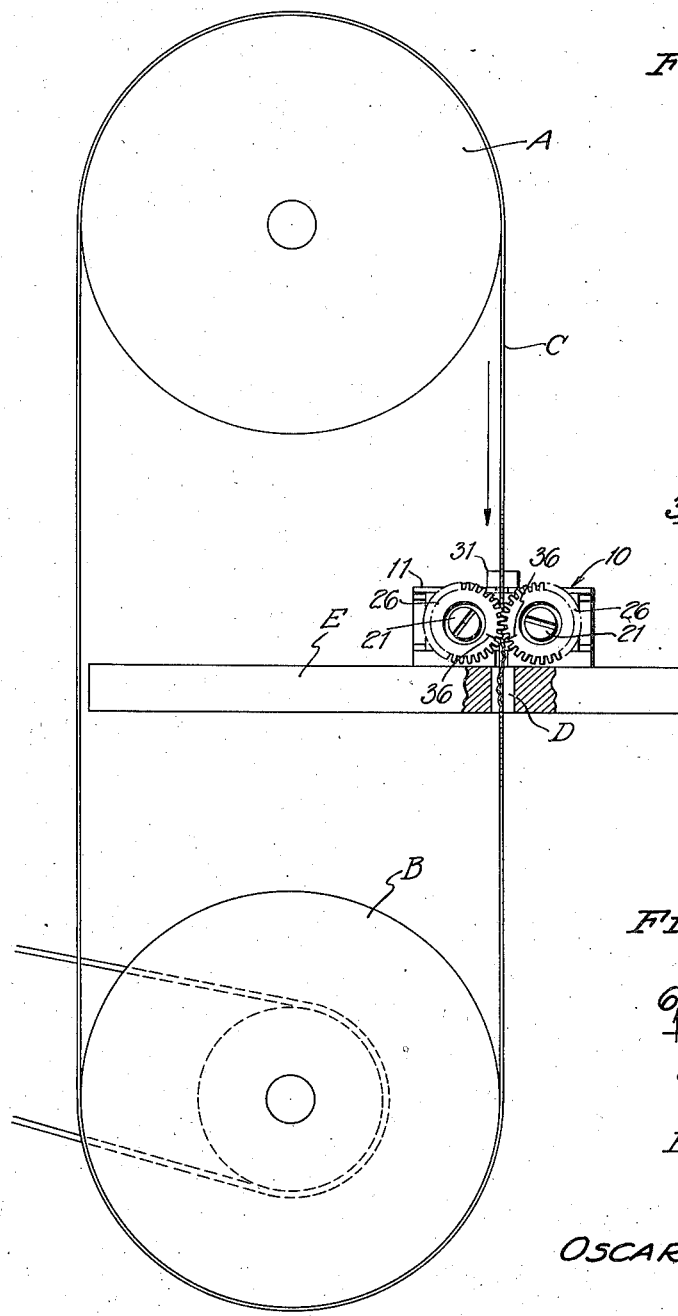
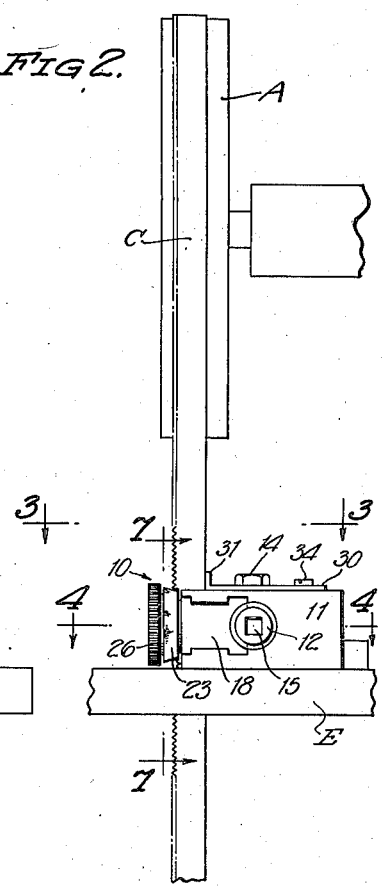
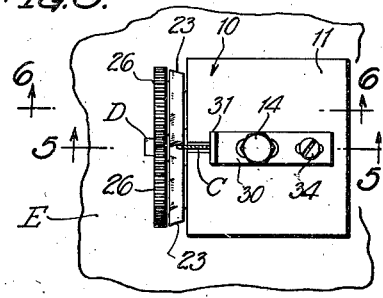
OSCAR T. S. MADSEN.
INVENTOR.
BY Ely & Pattison
ATTORNEYS.

Oct. 13, 1936.      O. T. S. MADSEN      2,057,439
TOOTH SETTING DEVICE FOR BAND SAW BLADES
Filed Dec. 7, 1935      2 Sheets-Sheet 2
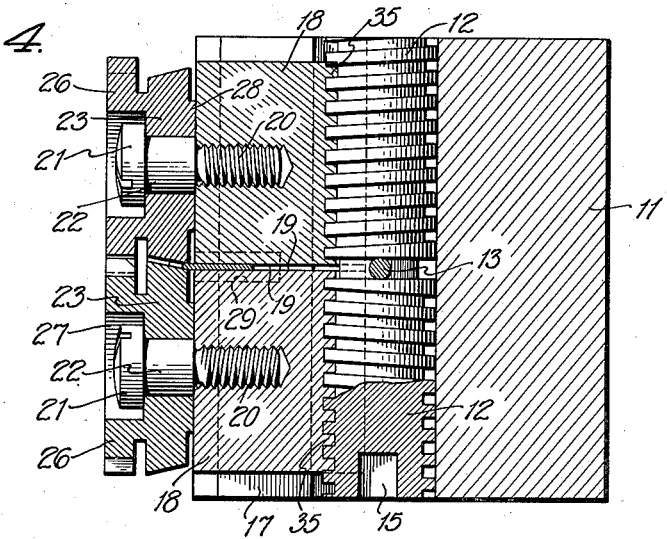
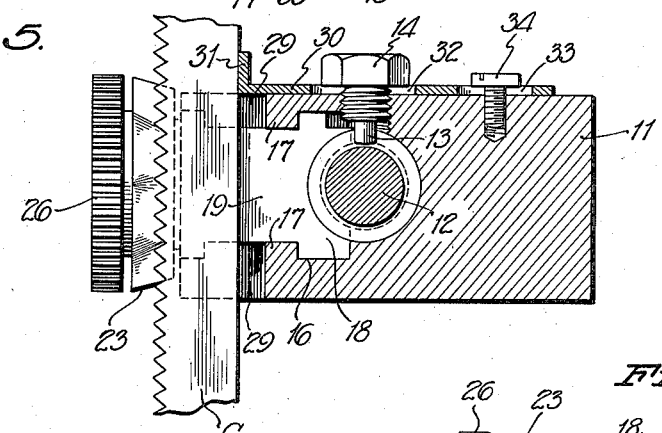
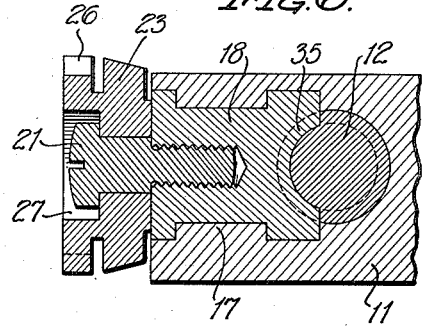
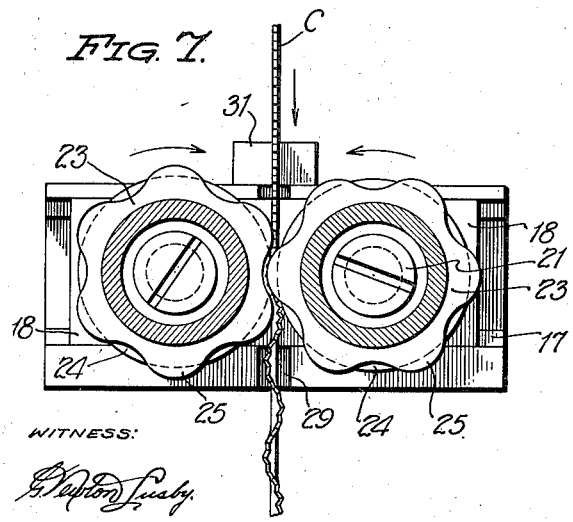
OSCAR T. S. MADSEN.
INVENTOR.

Patented Oct. 13, 1936

2,057,439

UNITED STATES PATENT OFFICE 2,057,439

TOOTH SETTING DEVICE FOR BAND SAW BLADES

Oscar T. S. Madsen, Scandia Vabis, Sodertalje, Sweden, assignor of one-fifth to David Hoglund, New York, N. Y.

Application December 7, 1935, Serial No. 53,441
In Sweden May 31, 1934

3 Claims. (Cl. 76—59)

This invention relates to improvements in tooth setting devices for band saws.

One of the main objects of the invention resides in a device which is capable of expediting the setting of the teeth of an endless band saw blade by performing such operation without necessitating the removal of the band saw blade from the wheels of the band saw over which the saw blade travels when in use.

Another feature of the invention is to provide a band saw blade setting device by which a uniform setting of the teeth thereof may be obtained throughout the entire length of the blade.

A further object of the invention is the provision of a band saw blade setting device which effects a bend in the body of the blade adjacent the toothed edge during the setting of the teeth for strengthening the set teeth which eliminates the frequent setting operations necessary to maintain a band saw blade in efficient cutting condition.

A still further object of the invention is to provide a band saw setting device which will restore the teeth of a band saw blade to a desired sawing condition.

A still further feature is to provide a band saw blade setting device which may be efficiently operated by one unskilled in the art of saw setting.

With these and other objects in view, the invention relates to the novel construction, combination and arrangement of parts, the essential features of which are fully described in the following specification, are particularly pointed out in the appended claims, and are illustrated in the accompanying drawings, in which:

Figure 1 is a fragmentary side elevational view of a band saw showing the invention associated therewith, parts being broken away in section.

Figure 2 is an end elevational view.

Figure 3 is a horizontal sectional view on the line 3—3 of Figure 2.

Figure 4 is an enlarged horizontal sectional view on the line 4—4 of Figure 2.

Figure 5 is an enlarged horizontal sectional view on the line 5—5 of Figure 3.

Figure 6 is an enlarged horizontal sectional view on the line 6—6 of Figure 3.

Figure 7 is a vertical sectional view on the line 7—7 of Figure 2.

Referring to the drawings by reference characters, the numeral 10 designates the band saw blade setting device in its entirety and which includes a rectangular shaped body 11 having a feed screw 12 journaled centrally therein and which extends from one side of the body to the opposite side. The feed screw 12 is held swiveled within the body by the reduced inner end 13 of a set screw 14, the set screw being threaded downwardly from the top of the body and which serves an additional purpose which will be explained hereinafter. The feed screw 12 is divided on opposite sides of its point of swivel connection into a set of right hand threads and a set of left hand threads as clearly shown in Figure 4 of the drawing. One end of the screw 12 is formed with a square socket 15 into which a wrench or tool may be inserted for imparting turning movement to the screw.

Opening through one side of the body 11 and communicating with the recess in which the screw is disposed, is an enlarged recess 16, the same extending the length of the body and having inwardly extending ribs 17. Seated within the recess 16 and guided by the ribs 17 are a pair of jaw members 18 having flat inner faces 19. The inner sides of the jaw members are provided with partial threads 35 for threading engagement with the right and left threads on the screw 12, so that turning of the screw will slide the jaw members simultaneously in opposite directions. The outer sides of the jaw members 18 are flush with the open side of the body 11 and threaded into the outer sides of the jaw members, are screws 20. Formed on the screws 20 inwardly of the heads 21 thereof are smooth axle portions or bearings 22 for rotatably supporting bending wheels 23. Each of the bending wheels 23 is of identical construction and comprises an undulant periphery, the valleys 24 of which are beveled outwardly and downwardly whereas the humps 25 are beveled downwardly and inwardly. It will thus be appreciated that when the humps of one of the wheels enters the valleys of the other, the beveled surfaces will be disposed in a parallel relation as shown in Figure 4 of the drawings.

Formed integral with each undulant wheel 23, is a gear 26, the teeth of which are relatively long. The gears 26 which form a pair and are integral with the respective undulant wheels 23 are normally in meshing engagement with each other but may be moved out of meshing engagement for the passage of a band saw blade therebetween when associating the device with a band saw to be set. In order to properly bring the gear wheels in meshing engagement after separation thereof, one of the teeth of one gear and a notch of the other gear are identified by radial marks 36 shown in Figure 1. The outer sides of the gears 26 are provided with central recesses 27 within which the heads 21 of the screws 20 are disposed.

The inner sides of the undulant wheels 23 are provided with hubs 28 which serve to space the undulated peripheries from the adjacent sides of the jaw members 18.

Communicating with the recess 16 and also opening through the same side of the base 11 as the said recess, are vertically alined slots 29 which are of sufficient length and width to freely accommodate the band saw blade to be operated upon.

Seated on the top of the body 11 is a guide plate 30, one end of which is provided with an upturned guide lip 31, while the body of the plate 30 is provided with an elongated slot 32 through which the shank of the set screw 14 extends. A second slot 33 is provided in the plate 30 through which the shank of a set screw 34 extends, the shank of the set screw 34 threading into the body 11. It will thus be seen that upon loosening of the screw 34 providing the set screw 14 is not in tightened position, the plate 30 may be adjusted transversely of the body, the lip end 31 serving as a guide for the band saw blade in its passage through the slot 29 and between the jaw members 18. Tightening up of the set screws 14 and 34 will serve to secure the guide plate 30 in an adjusted position.

In the drawings I have illustrated a portion of a band saw in order to show my invention in use. The letter A designates the upper guide wheel of a band saw, B the drive wheel mounted in vertical alinement with the wheel A, while passing over the wheels A and B is an endless band saw blade C, one lead of the band saw blade C passing through a slot D provided in the work support or table E. When it is desired to set the teeth of the band saw blade C, the device 10 is set upon the work support E adjacent the opening D. The feed screw 12 is turned to move the jaw members 18 away from each other and in view of the fact that the undulant wheels 23 and gears 26 are carried by the jaw members, they move therewith. The gears 26 and wheels 23 are moved apart a sufficient distance to facilitate the passage of the band saw blade C into the slots 29, whereupon the feed screw 12 is again actuated to move the jaw members 18 toward each other so as to frictionally embrace opposite sides of the body of the band saw blade. The toothed edge of the band saw blade projects beyond the plane of the outer sides of the jaw members at such distance as to dispose a portion of the body of the band saw blade within the plane of the undulant peripheries of the wheels 23, so that not only do the undulant wheels act upon the teeth of the band saw blade, but also act upon the adjacent portion of the body of the said blade. By bending the body of the blade just inwardly of the toothed edge, I am able to strengthen the teeth to prevent accidental breaking or rebending of the teeth during use of the saw blade.

By reason of the action of the several humps of one wheel meshing with the bevelled valleys of the other wheel, alternate groups of teeth are bent in opposite directions as shown in Figure 7 of the drawings, wherein the degree of bend may be slightly exaggerated over that in actual practice.

By adjustment of the guide plate 30, the toothed edge of the band saw blade may be set with respect to the undulant die wheels 23, the lip 31 of the guide plate being engageable by the rear edge of the band saw blade during its passage through the setting device. The lip 31 together with the flat faces 19 of the jaw members 18 constitute a guide means for the guiding of the saw blade in its passage between the bending wheels. These parts may be adjusted to compensate for blades of different widths and thicknesses.

During the setting operation, the endless band saw blade C is manually pulled downwardly in the direction of the arrow shown in Figure 1 so as to be forced between the undulant die wheels 23.

As above mentioned, the teeth of successive groups of set teeth are bent at opposite angles but the teeth of each group are disposed at gradually diminishing angles from the center of the valley outwardly toward the adjacent humps as shown in Figure 7 of the drawings. This is due to the fact that the coacting undulant surfaces of the undulant wheels although being disposed in parallel relation at their point of mesh, do not maintain a fixed angle of bend during rotation.

While I have shown and described what I consider to be the most practical embodiment of my invention, I wish it to be understood that such changes and alterations as come within the scope of the appended claims may be resorted to if desired.

Having thus described the invention, what I claim as new and desire to secure by Letters Patent of the United States, is:—

1. A band saw blade setting device comprising a body, a pair of jaw members slidably mounted in said body and disposed at one side thereof, screw means for moving said jaw members simultaneously toward and away from each other, the adjacent faces of said jaw members adapted to guide the body of the blade of a band saw to be set with the teeth and a portion of the body thereof inwardly of the teeth disposed beyond the outside of said jaw members, a pair of undulant wheels respectively journaled on the outside of said jaw members between which the teeth and a portion of the body of a band saw blade are adapted to pass, and gear means connecting said undulant wheels together for turning simultaneously in opposite directions.

2. A band saw setting device including a pair of duplicate setting wheels having coacting undulated peripheries, the humps and valleys of said undulations on each wheel being beveled axially in opposite directions and each engageable with a plurality of teeth of the saw to bend the teeth in groups in a continuous wave-like shape lengthwise of the blade, means for adjusting said wheels relative to each other, means for causing said undulant wheels to rotate simultaneously in opposite directions and means for guiding the saw blade with the teeth and a portion of the body of the blade between the undulated portions of the wheels.

3. A band saw setting device comprising a body, a pair of members slidably mounted in said body, screw means for simultaneously moving said members and holding them in an adjusted position relative to each other, a pair of duplicate setting wheels having coacting undulated peripheries, the humps and valleys of said undulations on each wheel being beveled axially in opposite directions and each engageable with a plurality of teeth of the saw to bend the teeth in groups in a continuous wave-like shape lengthwise of the blade, said wheels being respectively mounted on said members for turning movement, gear means connecting said wheels for simultaneous rotation in opposite directions and means for guiding the toothed edge of the blade between said wheels.

OSCAR T. S. MADSEN.